No. 795,739. PATENTED JULY 25, 1905.
R. H. STOLLAR.
WATER LEVEL INDICATOR.
APPLICATION FILED NOV. 22, 1904.

4 SHEETS—SHEET 1.

Witnesses:-
Frank L. A. Graham
A. P. Knight

Inventor,
Ross H. Stollar,
by Townsend Bros.
Attys.

No. 795,739. PATENTED JULY 25, 1905.
R. H. STOLLAR.
WATER LEVEL INDICATOR.
APPLICATION FILED NOV. 22, 1904.

4 SHEETS—SHEET 2.

Fig. 3ª

Witnesses:
Frank L. A. Graham
A. P. Knight

Inventor,
Ross H. Stollar,
by Townsend Bros.
attys.

No. 795,739. PATENTED JULY 25, 1905.
R. H. STOLLAR.
WATER LEVEL INDICATOR.
APPLICATION FILED NOV. 22, 1904.
4 SHEETS—SHEET 3.
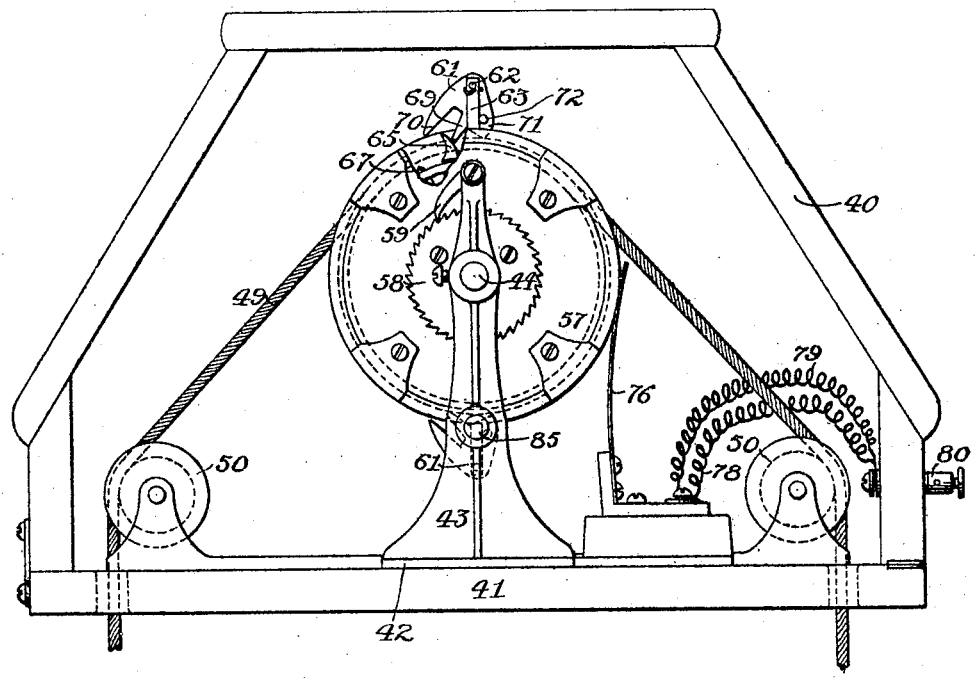
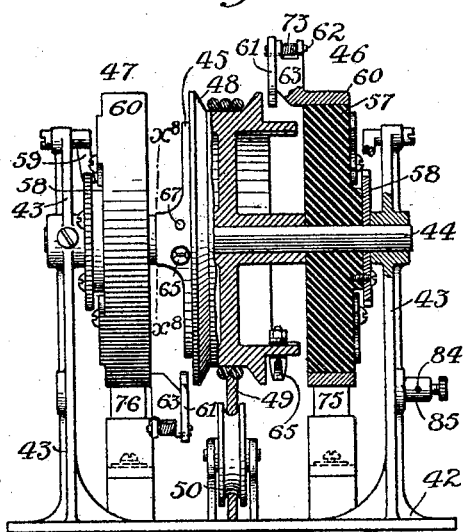
Witnesses:
Frank L. A. Graham
A. P. Knight
Inventor:
Ross H. Stollar:
by Townsend Bros.
attys

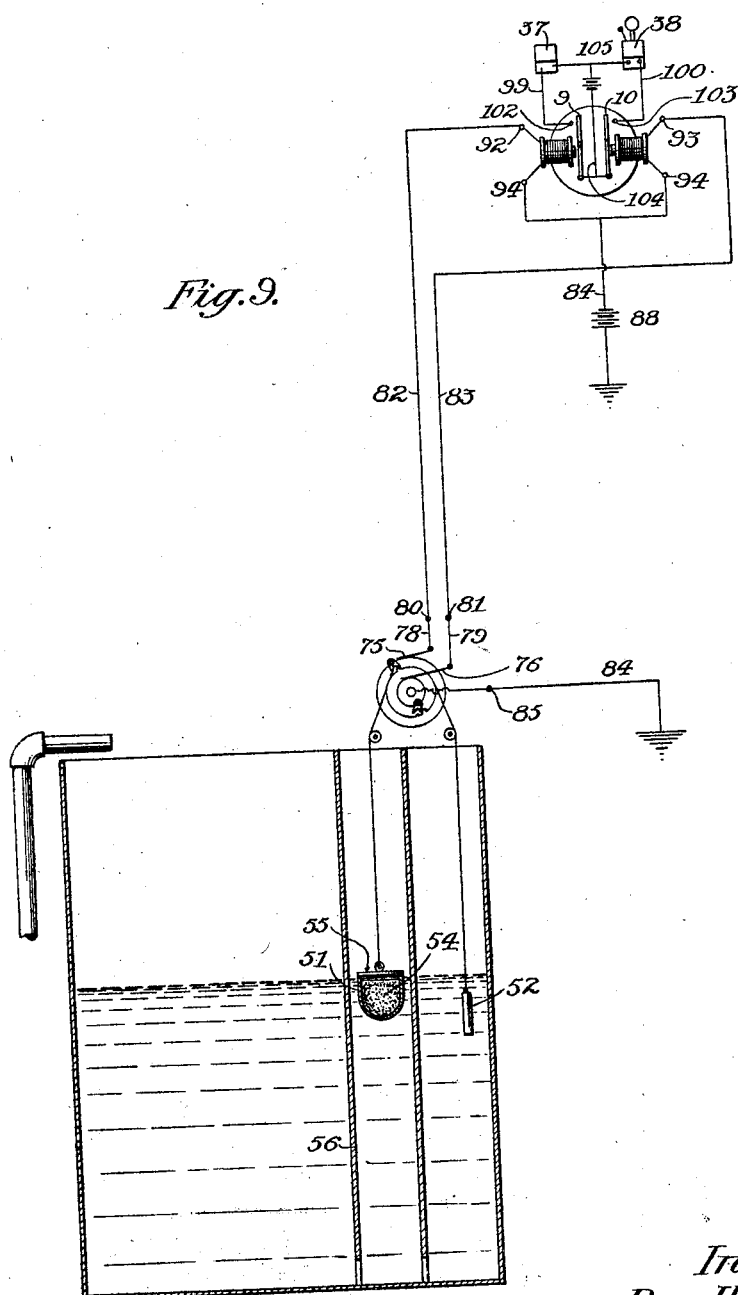

UNITED STATES PATENT OFFICE.

ROSS H. STOLLAR, OF LONGBEACH, CALIFORNIA, ASSIGNOR OF THREE FOURTHS TO GEORGE A. RANEY, SAMUEL J. TURK, AND EMMA STOLLAR, OF LONGBEACH, CALIFORNIA.

WATER-LEVEL INDICATOR.

No. 795,739.      Specification of Letters Patent.      Patented July 25, 1905.

Application filed November 22, 1904. Serial No. 233,813.

*To all whom it may concern:*

Be it known that I, Ross H. STOLLAR, a citizen of the United States, residing at Longbeach, in the county of Los Angeles, State of California, have invented new and useful Improvements in Water-Level Indicators, of which the following is a specification.

This invention relates to means for indicating at a distance the level of water in a reservoir or tank, or, generally, the level of any body of water.

The main object of this invention is to provide means for this purpose which will be simple and effective in operation and which will respond equally well to change of level in the water in either direction.

Another object of the invention is to increase the registering capacity of the indicator.

The invention comprises a transmitter of special construction, adapted to be operated by changes of the level in the body of water, and a receiver and indicator electrically connected to said transmitter and controlled thereby.

The accompanying drawings illustrate the invention.

Figure 1:
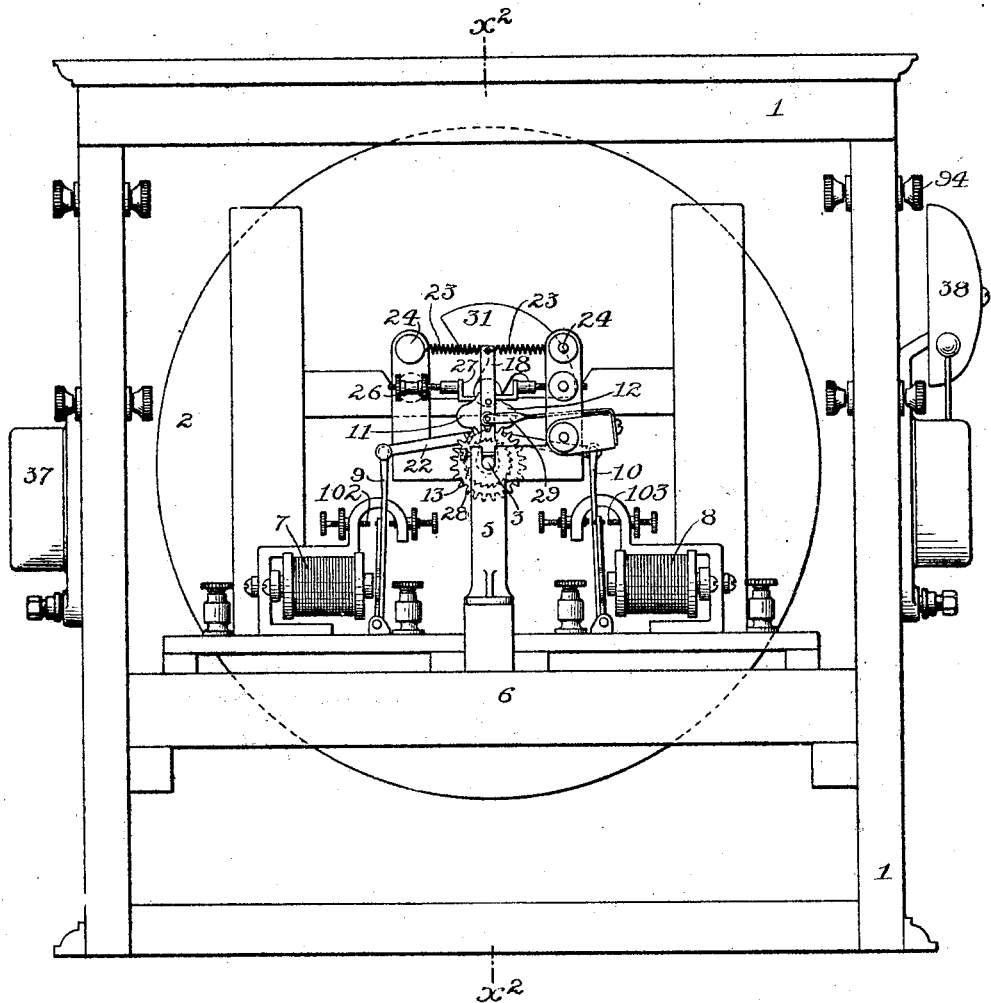
Figure 3:
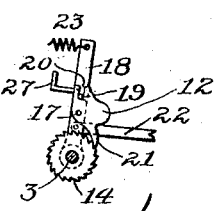
Figure 2:
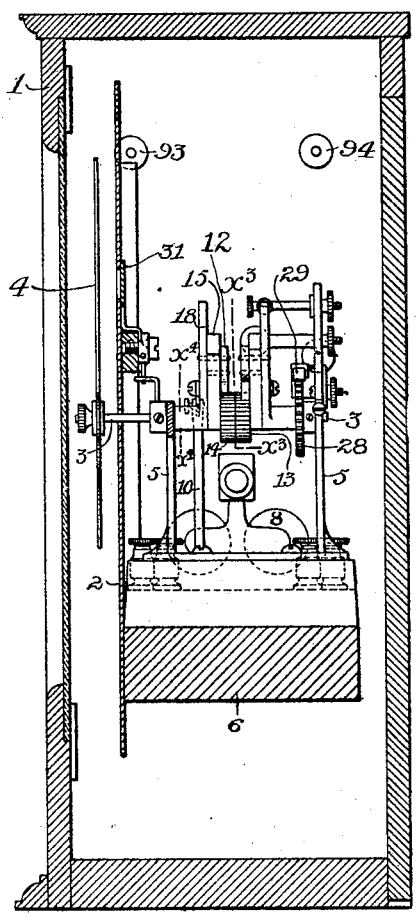
Figure 4:
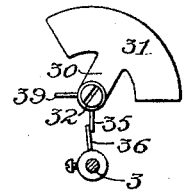
Figure 4:
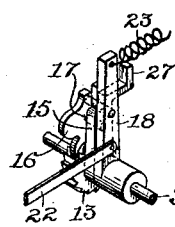
Figure 5:
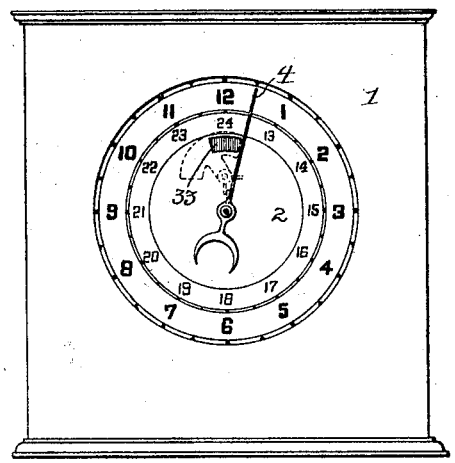

Figure 1 is a rear view of the receiving and indicating mechanism, the rear of the case being removed. Fig. 2 is a vertical section on line $x^2 \ x^2$ in Fig. 1. Fig. 3 is a detail section on the line $x^3 \ x^3$ in Fig. 2. Fig. $3^a$ is a perspective of a pawl-and-ratchet mechanism on the indicator. Fig. 4 is a detail section on line $x^4 \ x^4$ in Fig. 2. Fig. 5 is a front view of the indicator. Fig. 6 is a front elevation of the transmitting device, the front of the casing thereof being removed. Fig. 7 is a partly-sectional side elevation of the transmitting device. Fig. 8 is a section on line $x^8 \ x^8$ in Fig. 7. Fig. 9 is a diagram showing the electrical connections. Fig. 10 is a side view of a different form of the circuit-closing trip for preventing continuance of closure of the circuit under certain conditions. Fig. 11 is a rear elevation of Fig. 10.

Referring to Figs. 1 to 4, the receiver and indicator is mounted and inclosed in a suitable case 1, on the front of which is provided a dial 2, having suitable marks or divisions, as hereinafter explained. An arbor or shaft 3, rotatably mounted concentric with this dial, is provided with a pointer or index 4, adapted to travel over the face of the dial. This shaft or arbor may be mounted in bearings on a frame 5, extending from a base 6 within the case 1. Two sets of devices, substantially duplicates of each other, are provided for rotating said shaft in opposite directions. Said devices comprise magnets 7 8, mounted on said base 6 at opposite sides of the shaft and having armatures 9 10 connected to pawl devices 11 12, which operate ratchet-wheels 13 14 on the shaft, the teeth of which are reversely directed. Each pawl device 11 and 12 comprises an arm 15, rotatably mounted on the shaft and carrying a pawl member 16, which is pivoted thereto at 17, and an arm 18, also rotatably mounted on the shaft 3 and carrying a pin 19, engaging in a notch 20 in the pawl member 16, so that pivotal movement of the arm 18 in one direction will cause the pawl-tooth 21 of the pawl member 16 to engage in the ratchet-wheel 13 or 14, as the case may be, while reverse movement of the arm 18 will tip the pawl member backward to release the tooth thereof from said ratchet. The pawl members 16 of the respective pawl devices 11 12 are reversely directed in correspondence with the reverse direction of the ratchet-teeth on the wheels 13 14. Each pawl-actuating arm 18 is connected by a link or bar 22 with the respective armature 9 or 10, and springs 23 are provided connected at one end to said arms 18 and at the other end to suitable adjusting means 24 to act as retracting means for said arms and for the armatures. Suitable stop devices 25, preferably adjustable, are provided for the armatures 9 10. 26 designates an adjustable stop or screw that contacts with an extension 27 on each arm 15 to check the back movement thereof, so that further movement of arm 18 will tilt up the pawl out of engagement with the ratchet-wheel. 28 designates a star-wheel or toothed wheel on the shaft 3, engaged by a spring-dog 29 to cause the rotative movements of the shaft to be definite and certain and in correspondence with the dial-marks. From the above it will be understood that repeated operation of either one of the magnets will cause repeated actuation of the corresponding pawl device and a step-by-step rotative movement of the shaft 3 to cause the pointer thereon to move over the face of the dial, while operation of the other magnet will cause a reverse movement of the pointer. In order to increase the range or capacity of the device for a given size of dial, it is preferred to provide for more than one complete rotation of the pointer, the dial being provided with a plurality of annular series of designating numerals or marks and means being also provided for indicating on which one of said series the pointer is to be read. Thus the dial is shown as numbered from "1" to "12" in a complete circle and then from "13" to "24" in a second circle. A target device is provided for indicating which series of marks is being used. This target device comprises a plate or arm 30, carrying a target 31 at its outer end and pivotally mounted at 32 to the rear of the dial, so as to exhibit or display the target through an opening 33 in the dial. Said arm is provided with two pins or projections 34 35, adapted to be engaged by a pin, projection, or tappet 36 on the shaft 3, corresponding in position to the pointer on said shaft, so that as said pointer rotates and passes the twelfth or final mark in the first series it will engage one of said pins and throw the target over to the other side, showing that the second or higher series of numerals is to be used, while in the reverse movement of the pointer as it passes the same mark it will engage with the other pin or projection to reversely operate the target, showing that the first series of numerals is in use. While the target may be of any suitable means, it is convenient to provide the same with exhibiting portions of two different colors—for example, red and black—the two series of indicating marks or numerals being differently colored in correspondence with the colors on the target. 37 38 designate two electrically-operated audible-signal devices of different tone or character, so as to be readily distinguishable, one of said devices being, for example, a bell and the other a buzzer, said buzzer and bell being included, respectively, in local circuits 99 100, controlled by armatures 9 10 and contacts 102 103, closed when the respective armatures are attracted, said circuits having a common return-wire 104, including a local battery 105, so as to give an audible signal announcing the operation of the indicator for a rise of water-level and a different audible signal on lowering of the water-level.

The transmitter or circuit-closer for controlling the circuits for operating the above-described indicator is shown in Figs. 6 to 9 and is inclosed within a suitable case 40, on the base 41 of which is mounted a frame 42, with standards 43, carrying a fixed horizontal shaft 44. On said shaft between the standards 43 are mounted three circuit-controlling members 45 46 47, the central member 45 carrying or formed with a pulley 48 to enable rotation thereof, the said central member in said rotation coöperating with one or the other of said circuit-closing members on each side thereof to control one or the other of the circuits leading to the indicator.

A rope 49 engages around the pulley 48 and passes at opposite ends over the sheaves 50 and carries at one end a float 51 and at the other end a counterweight 52. (See Fig. 9.) The float is of sufficient bulk in proportion to its weight to prevent complete submersion and enable it to rise as the water rises. A desirable construction of the float is that shown, the same comprising a metallic shell or receptacle in which is screwed a top 55, provided with an eye for attachment to the rope, said shell being filled more or less with the weighted material 54, such as sand, to give the requisite weight for the proper operation of the circuit-closing mechanism, as hereinafter described.

A cylinder or tube 56 is preferably provided in fixed position in the tank or body of water surrounding the float and open at its lower end to permit the water to rise and fall therein in correspondence with the general level in the tank and to protect the float from oscillations or waves such as may be caused by the supply of water dropping into the tank.

Members 46 47 preferably comprise wheels or disks 57, of insulating material, turning on the fixed shaft 44 and each carrying ratchet-wheel 58, engaging a pawl 59, pivoted to a fixed support—for example, the standards 43—the ratchet-wheels and pawls on the respective members 46 47 being reversely directed, so that the member 46 can only rotate in one direction and the member 47 only rotate in the other direction. Each of the members 46 47 carries a metallic contact-ring 60, surrounding and attached to the insulating-ring 57, so as to be insulated thereby, and carrying a circuit-closing device formed as a latch 61, pivoted at 62 to an arm 63, extending outwardly and laterally from the said ring. The member 45 carries at each side an operating-pin and a contact-pin adapted to engage said latch, the operating-pin 65 being insulated by an insulating-support 66 from the body of the member 45, so that in its engagement with the latch it will not close the circuit and the contact-pin 67 being in direct connection with said member 45.

In the form of the invention shown in Figs. 8 and 10 the latch device 61 has two projections or fingers 69 70, the finger 69 being adapted to be engaged by the operating-pin 65 in one direction of movement thereof to turn the latch inwardly, so as to bring the finger 70 in proximity with or path of movement of the contact-pin 67. Another projection or part 71 of the latch device extends in the path of movement of the operating-pin 65, so as to be engaged thereby in the opposite direction of rotation thereof, and a stop-pin 72 on said latch device engages with the supporting-arm 63 to prevent outward tilting movement of the latch under these conditions, so that the latch and the connected ring 60, with the ratchet-wheel 58 and other parts connected thereto, will be carried around with the rotating member 45. A spring 73 tends to hold the latch in position (shown in Fig. 6) with its stop 72 in contact with arm 63.

Contact-springs 75 76 bear on the contact-rings 60 of the respective members 46 47 and are connected by wires 78 79 with binding-posts 80 81, to which are connected the circuit-wires 82 83, leading to the binding-posts 92 93 of the indicator, the return or ground circuit wire 84 leading through battery 88 from the return binding-post 94 of the indicator and being connected to binding-post 85 in the transmitter on the frame 42, thereby establishing connection, through said frame, the shaft 44, and member 45, with the contact-pins 67.

The operation of the apparatus is as follows: In general both the controlling-circuits will normally be open. Assuming the water to be rising, it will lift the float, allowing the counterweight to turn the pulley 48 and rotate the member 45 in the direction of the arrow in Fig. 6. If this movement is continued sufficiently, the operating-pin 67 will be brought into engagement with the operating-finger 69 of latch 61 and will turn said latch inwardly to position shown in dotted lines into the path of movement of contact-pin 68, the latch-carrying member 46 being held from rotation by its ratchet device, while the latch-carrying member 47 is freely rotated, as above described. A little further movement of the member 45 will carry said contact-pin under the finger 69 and make connection to the controlling-circuit to the indicator, the finger slipping over said contact and the further movement of the contact projection will break the circuit. The circuit referred to may be traced as follows: from battery 88, through wire 86, to binding-post 87, frame 42, shaft 44, member 45, contact projection 68, contact-finger 70, ring 60, contact-spring 75, connection 78, binding-post 80, circuit-wire 82, to the register or receiver, where it enters at binding-post 92, then connection 90 to electromagnet 7, then by binding-post 94 to return-wire 84 and the battery. The electromagnet 7 so energized will attract its armature, operating, through link 22, arm 18, and pin 19, to turn pawl 16 into engagement with ratchet-wheel 13 and on further movement to rotate the ratchet-wheel one step and cause the pointer 4 to move one division, the buzzer being at the same time sounded by the closure of armature 9 on contact 102. The breaking of the circuit will release the armature and allow spring 23 to pull the arm 18 back, thereby moving the pawl out of engagement with the ratchet-wheel and restore the parts to normal position. On continued rise of water this operation will be repeated and each foot, half-foot, or other unit of rise being indicated, and as the pointer completes one revolution it will operate the target 31, as above described, to show that the measurement is to proceed on the other series of marks. On lowering of the water-level the operation will be reversed in obvious manner, the bell being in this case sounded instead of the buzzer.

The trip contact devices above described are designed with a view to preventing the battery from remaining on closed circuit, except momentarily, as the wheel turns under same and the contact-finger slips over the turning contact; but there is a slight possibility of the movement of the wheel being arrested at this precise moment of closure, and to provide for this contingency I may use the form of trip contact device shown in Figs. 10 and 11, wherein 108 109 are respectively the trip actuating and contact devices on the rotating member 60, and 110 is the trip device or arm, pivoted by pin 115 to the arm 63 and carrying a spring-contact 111, operated by a spring 112, a spring 113 tending to turn this arm inwardly or against the direction of rotation of member 61. The arm 63 carries a cylinder 116, in which works a piston 117, pivotally connected to the arm 110 aforesaid. Said arm 110 has a finger 118, that is adapted to be engaged by the operating projection 108 on the rotary member 61. When so engaged, it draws out the piston and moves up the contact trip device 110. Then when the projection 108 passes up from beneath finger 118 the arm 110 will move back the piston and cylinder, acting as a dash-pot to cause the contact device 111 to wipe slowly over the contact member 109 on rotating member 61.

The object of having two sets of contact devices with pawl-and-ratchet means for allowing free movement of each in one direction and arresting such movement in the other direction is to insure that after a contact has been made—registering, for example, a rise of one foot—the back movement of the parts due to a retrograde movement of the water-level will not affect the contacts until a complete back revolution corresponding to a drop of one foot takes place.

It will be understood that this water-level indicator can be used for indicating the level of any liquid—such as water, oil, &c.—and when the term "water" is used herein it includes any liquid.

What I claim is—

1. In a water-level indicator a rotatable indicator-shaft carrying reversely-directed ratchet-wheels, pawl-arms rotatable on said shaft, pawls pivoted on each arm and normally disengaging the ratchet-wheel, operating-arms rotatable on said shaft and having pins engaging said pawls to turn them into engagement with the ratchet-wheels respectively by their initial rotation movement and to rotate the ratchet-wheels by the further rotation movement of said operating-arms, electromagnets, and means connecting the armatures thereof to said operating-arms.

2. A water-level indicator comprising a rotatable shaft carrying a pointer, a dial over which said pointer moves, said dial having two series of marks corresponding to the successive revolutions of the pointer and a designating device for the respective series of marks operated by the movement of the shaft when the pointer passes from one revolution and carrying a movable target marked to correspond to the two series of marks, and means for exhibiting one or the other of the marked portions of the target.

3. A circuit-closer for water-level indicators comprising a rotatable float-operated member carrying an operating projection and a contact portion, and a spring-latch carrying a projection engaged by the operating projection to pivotally operate the latch and also provided with a contact portion to engage and slip over the contact portion in the rotative movement of the latter when the latch is so operated.

4. In a circuit-closer for water-level indicators, the combination of a float-operated shaft, a circuit-closing member carried thereby and provided with an operating projection, and the circuit-closing member on each side of the first-named circuit-closing members, comprising a spring-latch device having a finger to be engaged by said operating projection, and a contact-pointer to contact with the contact projection and circuit connections to said latches and contact-points.

5. In a circuit-closer for water-level indicators the combination of a float-operated shaft, a circuit-closing member carried thereby and provided with an operating projection, and the circuit-closing member on each side of the first-named circuit-closing member, comprising a spring-latch device having a finger to be engaged by said operating projection, a contact-pointer to contact with the contact projection, reversely-operating ratchet devices holding the respective latch-carrying members from rotation, respectively in opposite directions, means on the latch devices for engaging the operating projections in the reverse movement of the latter, stop means for arresting the pivotal movement of the latch devices when so engaged.

6. In a water-level indicator, a rotary contact member having an actuating projection and a contact projection, and a pivoted trip device having a part to engage said actuating projection, and a spring-contact to engage the contact projection, a spring acting on said trip device, and a dash-pot connected to said trip device.

In testimony whereof I have hereunto set my hand, at Los Angeles, California, this 12th day of October, 1904.

ROSS H. STOLLAR.

In presence of—
ARTHUR P. KNIGHT,
JULIA TOWNSEND.